(12) United States Patent
Tsirkin et al.

(10) Patent No.: US 10,521,256 B2
(45) Date of Patent: *Dec. 31, 2019

(54) VIRTUAL MACHINE MIGRATION ACCELERATION WITH PAGE STATE INDICATORS

(71) Applicant: Red Hat Israel, Ltd., Raanana (IL)

(72) Inventors: Michael Tsirkin, Raanana (IL); David Alan Gilbert, Manchester (GB)

(73) Assignee: RED HAD ISRAEL, LTD., Ra'anana (IL)

(*) Notice: Subject to any disclaimer, the term of this patent is extended or adjusted under 35 U.S.C. 154(b) by 280 days.

This patent is subject to a terminal disclaimer.

(21) Appl. No.: 15/251,478

(22) Filed: Aug. 30, 2016

(65) Prior Publication Data

US 2018/0060100 A1 Mar. 1, 2018

(51) Int. Cl.
*G06F 9/455* (2018.01)
*G06F 9/50* (2006.01)

(52) U.S. Cl.
CPC ........ *G06F 9/45558* (2013.01); *G06F 9/5088* (2013.01); *G06F 2009/4557* (2013.01); *G06F 2009/45583* (2013.01)

(58) Field of Classification Search
CPC ......... G06F 9/45558; G06F 2009/4557; G06F 2009/45583; G06F 9/5088
See application file for complete search history.

(56) References Cited

U.S. PATENT DOCUMENTS

| 6,802,062 | B1 | 10/2004 | Oyamada et al. |
| 6,804,729 | B2 | 10/2004 | Swanberg |
| 7,962,703 | B1 | 6/2011 | Shah et al. |
| 8,146,078 | B2* | 3/2012 | Bennett ............... G06F 9/45533 713/400 |
| 8,356,149 | B2 | 1/2013 | Young et al. |
| 8,386,731 | B2 | 2/2013 | Mashtizadeh et al. |
| 8,656,388 | B2 | 2/2014 | Chou et al. |

(Continued)

OTHER PUBLICATIONS

Brendan Cully, "Generalized High Availability via Virtual Machine Replication" http://citeseerx.ist.psu.edu/viewdoc/download?doi=10.1.1.186.4141&rep=rep1&type=pdf, The University of British Columbia, Oct. 2007, 61 pages.

(Continued)

*Primary Examiner* — Jacob D Dascomb
(74) *Attorney, Agent, or Firm* — Haynes and Boone LLP

(57) ABSTRACT

Methods, systems, and computer program products are included for migrating a virtual machine. An example method of migrating a virtual machine includes transmitting, from a hypervisor, a migration indicator to a guest. The hypervisor receives a free memory page indicator from the guest that identifies one or one or more free memory pages corresponding to a virtual machine. The hypervisor then places the virtual machine in a suspended state. While the virtual machine is in the suspended state, the hypervisor modifies a dirty status and a migration status corresponding to one or more dirty memory pages. After resuming operation of the virtual machine from the suspended state, the hypervisor modifies a migration status corresponding to the one or more free memory pages to exclude the one or more free memory pages from a migration. The hypervisor migrates the one or more dirty memory pages.

16 Claims, 4 Drawing Sheets

(56) References Cited

U.S. PATENT DOCUMENTS

| | | | |
|---|---|---|---|
| 8,667,490 | B1 | 3/2014 | Van der Goot |
| 9,032,398 | B2 | 5/2015 | Ahmed et al. |
| 9,197,489 | B1 | 11/2015 | Vincent |
| 9,672,054 | B1* | 6/2017 | Gupta ................. G06F 9/45533 |
| 2008/0163239 | A1* | 7/2008 | Sugumar ............... G06F 9/5088 |
| | | | 718/105 |
| 2009/0307447 | A1* | 12/2009 | Jacobs ................ G06F 11/0712 |
| | | | 711/162 |
| 2011/0066819 | A1* | 3/2011 | Mashtizadeh ......... G06F 3/0617 |
| | | | 711/162 |
| 2012/0179855 | A1* | 7/2012 | Tsirkin ................ G06F 9/45558 |
| | | | 711/6 |
| 2013/0254321 | A1 | 9/2013 | Johnsen et al. |
| 2015/0095576 | A1 | 4/2015 | Subrahmanyam et al. |
| 2015/0149687 | A1 | 5/2015 | Tsirkin et al. |
| 2015/0234684 | A1* | 8/2015 | Bacher .................. G06F 9/5016 |
| | | | 711/6 |
| 2018/0136971 | A1* | 5/2018 | Dong .................. G06F 9/45558 |

OTHER PUBLICATIONS

Brendan Cully et al., "Remus: High Availability via Asynchronous Virtual Machine Replication" https://www.usenix.org/legacy/event/nsdi08/tech/full_papers/cully/cully_html/, Department of Computer Science the University of British Columbia, accessed May 4, 2016, 23 pages.

Michael Tsirkin et al. "Virtual Machine Migration Using Free Page Hinting" U.S. Appl. No. 14/850,055, filed Sep. 10, 2015, 30 pages.

Michael Tsirkin et al. "Virtual Machine Migration Using Free Page Hinting" Office Action for U.S. Appl. No. 14/850,055 dated May 19, 2016, 12 pages.

* cited by examiner

VIRTUAL MACHINE MIGRATION ACCELERATION WITH PAGE STATE INDICATORS

FIELD OF DISCLOSURE

The present disclosure generally relates to electrical computers and digital data processing, and more particularly relates to virtual machine migration.

BACKGROUND

A virtual machine is software that is executed on hardware to create a virtualization of a physical computer system. Virtual machines may function as self-contained platforms that run their own operating systems and software applications. A host machine may concurrently run one or more virtual machines using software that is referred to as a hypervisor. The hypervisor allocates a certain amount of the host machine's resources, such as the host machine's underlying physical processors and memory devices, to each of the virtual machines. This allocating by the hypervisor allows guests of the virtual machines to transparently access the host machine's resources.

Guest applications, including guest operating systems, may be executed on the allocated resources of each virtual machine. Local or remote clients may access these guest applications to perform computing tasks. In some instances, virtual machines and guest applications may be implemented to provide cloud computing environments.

SUMMARY

According to an example, a method includes transmitting, from a hypervisor, a migration indicator to a guest. The hypervisor receives a free memory page indicator from the guest, where the free memory page indicator identifies one or one or more free memory pages corresponding to a virtual machine. The hypervisor places the virtual machine in a suspended state, where while the virtual machine is in the suspended state the hypervisor modifies a dirty status and a migration status corresponding to one or more dirty memory pages. After resuming operation of the virtual machine from the suspended state, the hypervisor modifies a migration status corresponding to the one or more free memory pages to exclude the one or more free memory pages from a migration. The hypervisor migrates the one or more dirty memory pages to another location in memory or to another host machine.

According to an example, a non-transitory machine-readable medium having stored thereon machine-readable instructions executable to cause a machine to perform operations including: transmitting, from a hypervisor, a migration indicator to a guest. The operations also include receiving, by the hypervisor, a free memory page indicator from the guest, where the free memory page indicator identifies one or one or more free memory pages corresponding to a virtual machine. The operations also include placing the virtual machine in a suspended state, where while the virtual machine is in the suspended state the hypervisor modifies a dirty status and a migration status corresponding to one or more dirty memory pages. After resuming operation of the virtual machine from the suspended state, the operations further include modifying a migration status corresponding to the one or more free memory pages to exclude the one or more free memory pages from a migration. The operations also include migrating, by the hypervisor, the one or more dirty memory pages.

According to an example, a system includes one or more hardware processors coupled to a memory, the one or more hardware processors to read instructions from the memory and cause the system to perform operations including transmitting, from a hypervisor, a migration indicator to a guest. The operations also include receiving, by the hypervisor, a free memory page indicator from the guest, where the free memory page indicator identifies one or one or more free memory pages corresponding to a virtual machine. The operations also include placing the virtual machine in a suspended state, where while the virtual machine is in the suspended state the hypervisor modifies a dirty status and a migration status corresponding to one or more dirty memory pages. After resuming operation of the virtual machine from the suspended state, the operations further include modifying a migration status corresponding to the one or more free memory pages to exclude the one or more free memory pages from a migration. The operations also include migrating, by the hypervisor, the one or more dirty memory pages.

Figure 1:
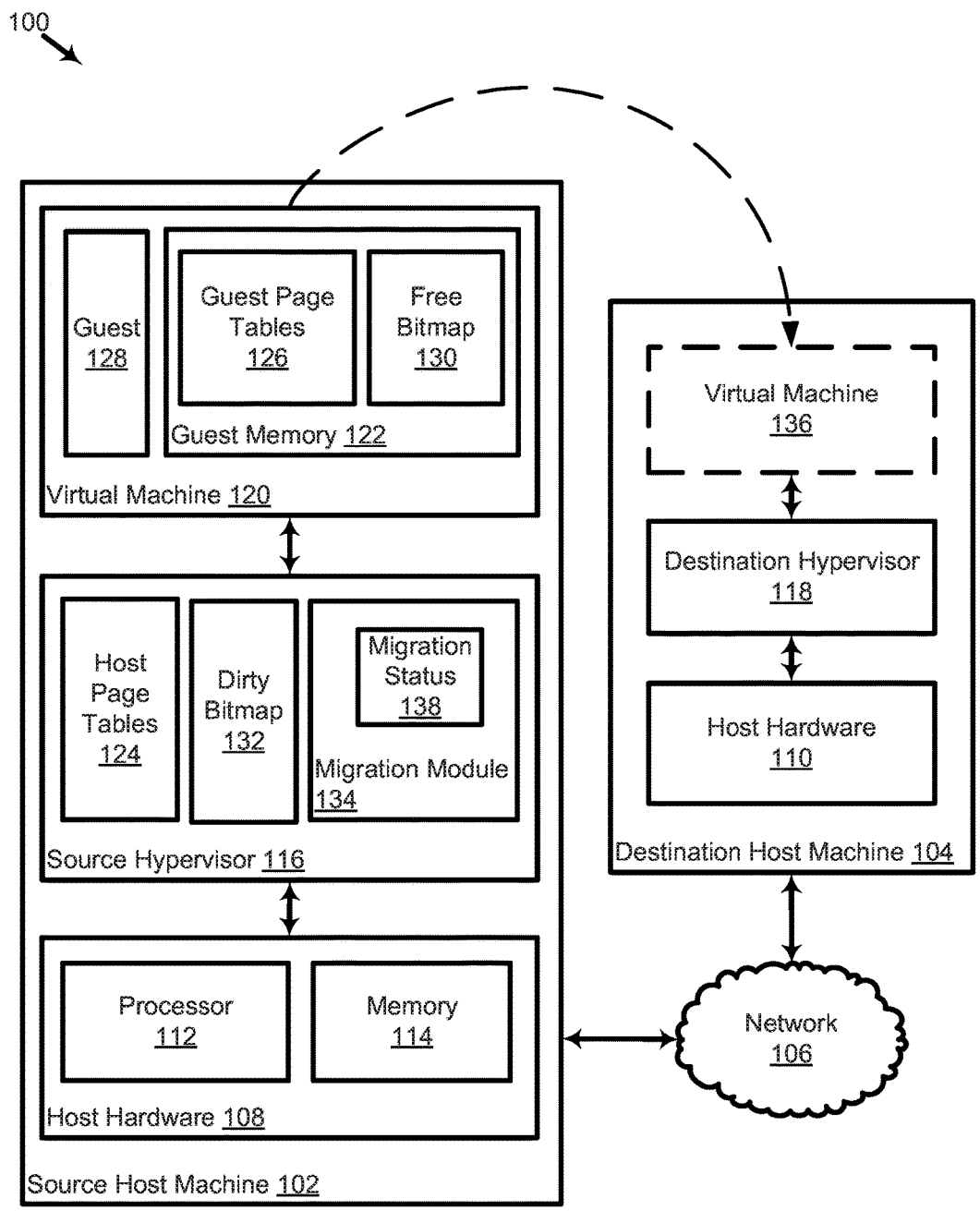
FIG. 1 is an organizational diagram illustrating a system for migrating a virtual machine from a source hypervisor to a destination hypervisor, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide techniques for migrating a virtual machine running on a hypervisor of source host machine to another location in memory or over a network to a destination host machine. A virtual machine may be migrated for a variety of reasons. In some examples, a fault may occur or be anticipated with respect to the hypervisor and/or the virtual machine. Accordingly, the hypervisor or a guest running on the virtual machine may trigger a migration of the virtual machine to another computing device as a failsafe mechanism. In this way, the virtual machine may remain active on another host machine despite the fault occurring on a first host machine. In other examples, a user may initiate the migration so that the host machine may be taken offline and/or serviced. For instance, the user may wish to reboot or replace a component of a host machine that is running the hypervisor and the virtual machine. In yet other examples, a human administrator or software module may detect that a host machine is resource constrained and initiate the migration to reduce the computing load on the host machine by shifting application execution to another host machine. Accordingly, the administrator or the software module may initiate the migration of the virtual machine to a destination machine that has more computing resources available.

The migration of the virtual machine is performed by copying and/or transmitting memory pages from the guest memory that is allocated to the virtual machine. One problem with traditional virtual machine migration techniques is that virtual machine migration may be performed too slowly. This problem is addressed in the present disclosure by reducing the amount of memory pages migrated, thus increasing the speed of the migration. In particular, the migration of the memory pages is improved by identifying free memory pages of the virtual machine and excluding these free memory pages from the migration. For example, the hypervisor may notify a guest that is running on the virtual machine when a migration is initiated. The hypervisor may then delay the migration temporarily, so that the guest may respond to the notification by providing the hypervisor with a list of free memory pages. The hypervisor may then stop the virtual machine to allow the hypervisor to clear a dirty status of determined dirty memory pages and include these memory pages in a list of memory pages to migrate. The hypervisor may then re-enter the virtual machine and scan the received list of free memory pages to remove the free memory pages from the list of memory pages to migrate. Accordingly, the free memory pages are not included in the migration and the amount of memory pages migrated is reduced.

These techniques are beneficial and advantageous for reducing the amount of data that is accessed, stored, and/or transmitted to perform a migration of a virtual machine. Reducing the computing resources associated with these computing tasks allow for the migration to be performed faster and more efficiently. For example, large numbers of memory pages may be excluded from a migration, thus reducing processing, network, and memory resources that would be consumed by reading data from the memory pages, transmitting the data over a network, and/or storing the data at the destination. Of course, it is understood that these features and advantages are shared among the various examples herein and that no one feature or advantage is required for any particular example.

FIG. 1 is an organizational diagram illustrating a system 100 for migrating a virtual machine from a source hypervisor to a destination hypervisor, in accordance with various examples of the present disclosure.

The system 100 includes a source host machine 102. The source host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single source host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The system 100 includes a destination host machine 104, which may be structured similarly to the source host machine 102 described above. For example, the destination host machine 104 may include a personal computer (PC), tablet PC, rack mount computer, cellular telephone, web appliance, server, network router, switch or bridge, or any machine capable of executing a set of instructions (sequential or otherwise) that specify actions to be taken by that machine.

The source host machine 102 and the destination host machine 104 are communicatively coupled by a network 106 that communicates data between the source host machine 102 and the destination host machine 104. For example, the network 106 may transmit data corresponding to one or more virtual machines from the source host machine 102 to the destination host machine 104. The network 106 may include one or more public and/or private networks, which may each be comprised of network devices that transfer data via wired and/or wireless transmission media.

The source host machine 102 is structured with host hardware 108. The host hardware 108 includes physical elements such as a processor 112 and a memory 114. In some examples more than one of each of these hardware elements may be included. For example, the host hardware 108 may include a plurality of processors coupled to various types of memory and host devices. The destination host machine 104 similarly is structured with host hardware 110, which may include similar components to those described with respect to the host hardware 108 of the source host machine 102. For example, the host hardware 110 may include one or more processors coupled to one or more memory devices.

The processor 112 included in the host hardware 108 is structured to include one or more general-purpose processing devices such as a microprocessor, central processing unit, and the like. More particularly, the processor 112 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 112 is structured to include one or more special-purpose processing devices such as an application specific integrated circuit (ASIC), a field programmable gate array (FPGA), a digital signal processor (DSP), network processor, and so forth. The processor 112 executes instructions for performing the operations, steps, and actions discussed herein.

The memory 114 included in the host hardware 108 is structured to include at least one computer-readable storage medium on which is stored one or more sets of instructions (e.g., software) embodying any one or more of the methodologies or functions described herein. The memory 114 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor 112.

The processor 112 and memory 114 may be communicatively coupled via one or more buses (e.g., a PCI bus) and/or integrated into a motherboard of the source host machine 102. The host hardware 108 also may include other hardware elements, such as a video display unit (e.g., a liquid crystal display (LCD) monitor), alphanumeric input device (e.g., a keyboard), cursor control device (e.g., a mouse), signal generation device (e.g., a speaker), a network interface card, wireless adapter card, audio/sound card, graphics card, storage adapter, and/or other hardware device.

The source host machine 102 is structured to include a source hypervisor 116, which may include a virtual machine monitor and/or virtual machine manager. The source hypervisor 116 is structured with executable instructions that are stored in the memory 114 and executed by the processor 112 to provide one or more virtual machines. In some examples, the source hypervisor 116 is structured to run on top of an operating system and/or kernel. In other examples, the source hypervisor 116 is run directly on host hardware 108 without the use of a separate operating system or kernel.

The destination host machine 104 similarly is structured with a destination hypervisor 118, which may include similar components to those described with respect to the source hypervisor 116 of the source host machine 102. For example, the destination hypervisor 118 is structured with executable instructions that are stored and executed using the host hardware 110 to provide one or more virtual machines on the destination host machine 104. The destination hypervisor 118 may also run on top of an operating system and/or kernel, or run directly on the host hardware 110 without the use of a separate operating system or kernel.

The system 100 includes a virtual machine 120 that is provided by the source hypervisor 116. The source hypervisor 116 is structured to provide the virtual machine 120 by virtualizing at least a portion of the host hardware 108. The source hypervisor 116 may provide the virtual machine 120 by performing a hardware emulation, full virtualization, para-virtualization, and/or operating system-level virtualization corresponding to the source host machine 102. The source hypervisor 116 manages system resources, including providing access of guests (e.g., guest applications such as operating systems, kernels, user applications, and so forth) of the virtual machine 120 to the host hardware 108, such as the processor 112 and the memory 114.

Although one virtual machine is illustrated as running on source host machine 102, the source hypervisor 116 may provide a plurality of virtual machines. Other virtual machines may include components similar to those illustrated with respect to virtual machine 120, such as a guest, guest memory, guest page tables, and so forth.

The virtual machine 120 is structured with a guest memory 122. The guest memory 122 is a memory resource that is provided by the source hypervisor 116. The source hypervisor 116 is structured to provide the guest memory 122 by allocating a portion of the memory 114 using the host page tables 124. The memory 114 is divided into host-physical memory addresses that are portioned into fixed-length blocks of memory that compose memory pages. The host page tables 124 provide entries corresponding to the memory pages that are included in one or more tables. The host page tables 124 use the entries to map one or more ranges of the host-physical memory addresses into one or more guest-physical address ranges that are assigned to the virtual machine 120 as the guest memory 122.

The guest memory 122 is structured with guest page tables 126 that provide another layer of memory addresses mappings. The guest page tables 126 map one or more ranges of guest-virtual memory addresses to the guest-physical addresses provided by the host page tables 124. Accordingly, the guest-virtual memory addresses are mapped to guest-physical memory addresses by the guest page tables 126, and the guest-physical memory addresses are mapped to the host-physical memory addresses by the host page tables 124. Thus, memory pages in the guest memory may include one or more guest-virtual memory addresses that map to host-physical memory addresses by way of the guest page tables 126 and the host page tables 124.

The virtual machine 120 includes at least one guest 128, which may include a kernel, operating system (OS), and/or other application running on the virtual machine 120. A guest kernel of the virtual machine 120 may provide core computing functionality, such as allocating memory pages of the guest memory 122 to processes and/or threads, communicating input and/or output (UO) to and from virtual devices, managing a file system, handling interrupts, scheduling and running processes to execute instructions of computing tasks by a virtual processor, providing an interface between devices and software applications, and/or providing other important computing features. A guest operating system of the virtual machine 120 may run on top of the kernel to provide additional interfaces and functionality on the virtual machine 120 beyond those offered by the kernel. The guest operating system may include, for example, RED HAT ENTERPRISE LINUX, FEDORA, WINDOWS, OS X, IOS, ANDROID, or any other operating, system. In some examples, the virtual machine 120 may be structured to include a plurality of guest operating systems.

The guest 128 (e.g., one or more guest kernels, guest operating systems, and/or other applications) running on the virtual machine may access the guest-virtual memory addresses provided by the guest memory 122 to read, write, and/or execute data. The guest page tables 126 and the host page tables 124 translate the guest-virtual memory addresses to host-physical memory addresses using their page table mappings. Accordingly, the guest 128 is provided read, write, and/or execute access to data stored in the memory 114.

Memory pages may be classified as dirty memory pages or free memory pages based on their current usage or non-usage status. Dirty memory pages include memory pages that have been allocated, to one or more guests of the virtual machine and modified to store data. For example, memory pages may be allocated to store executable instructions that are executed by a process running on the virtual machine. In another example, memory pages may be allocated to store other types of data for guests of the virtual machine, such as media files, databases, program files, and/or any other type of data. These memory pages that are allocated and modified for storing data are classified as dirty memory pages.

Free memory pages include memory pages in the guest memory 122 that are not in-use and/or are, available for allocation by the virtual machine. Free memory pages may include pages that have not been previously allocated as well as memory pages that have been previously allocated but have since been deallocated and/or freed. Memory pages may be freed when the data stored on the memory pages is no longer used and the memory pages are therefore no longer active. Accordingly, free memory pages may be inactive memory pages that store data but are not in-use, clean memory pages that are zeroed out, and other memory pages that are in a pool of memory pages that are available for allocation and use by programs running on the virtual machine 120.

The guest memory 122 is structured with a free bitmap 130 that maintains status indicators corresponding to the memory pages in the guest memory 122. The free bitmap 130 is structured to store a plurality of bits, where each bit has a zero or a one value corresponding to a memory page in guest memory 122. Each bit indicates whether the memory page corresponding to the bit is in-use or free. The guest 128 may update the free bitmap 130 to track an up-to-date status of each memory page. Accordingly, the free bitmap 130 may be updated as memory pages are allocated and modified to indicate that the memory pages are in-use. Similarly, as memory pages are deallocated the guest 128 may update the free bitmap 130 to indicate that the memory pages are free memory pages that are available for allocation. Although the free bitmap 130 is illustrated as being located in guest memory 122, in other examples the free bitmap 130 may reside outside of the guest memory 122 in any memory region that is accessible by the source hypervisor 116.

The source hypervisor 116 is structured to include a dirty bitmap 132 that maintains status indicators corresponding to memory pages. The dirty bitmap 132 stores a plurality of bits, where each bit has a zero or a one value corresponding to a memory page in a guest memory 122. The dirty bitmap 132 includes dirty bits that indicate whether a memory page has been modified by a guest. A first bit value (e.g., 1) may indicate that a memory page has been modified, while a second bit value (e.g., 0), may indicate that the memory page has not been modified. The source hypervisor 116 is structured to update the dirty bitmap 132 to maintain an up-to-date status of each memory page. In some examples, the source hypervisor 116 marks the pages in the guest memory 122 as read-only (e.g., by write protecting the memory pages) during the initialization of the virtual machine 120. When a guest writes to a memory page in the guest memory 122, the memory access is trapped into the source hypervisor 116. Based on this trap, the source hypervisor 116 may set a bit corresponding to the memory page to indicate that the memory page is dirty. In other examples, dirty bits are stored in the host page tables 124 and the source hypervisor 116 traverses page table entries to fetch the dirty bits and write the dirty bits to the dirty bitmap 132. In yet other examples, the processor 112 signals to the source hypervisor 116 which memory pages have been modified using interrupts or other signaling mechanisms so that the source hypervisor 116 may update the dirty bitmap 132.

While the host page tables 124, guest page tables 126, free bitmap 130, and dirty bitmap 132 are described as including particular data structures (e.g., tables and bitmaps), in other examples other suitable data structures may be used instead of or in addition to tables or bitmaps. Moreover, while bits are described as being set or cleared to indicate the status of a memory page, other values (represented by one or more bits) may be used to indicate the status of the memory pages.

The system 100 is structure to include a migration module 134 that manages the transfer of virtual machines between host machines and/or between memory locations on a same host machine. For example, the migration module 134 may copy memory pages corresponding to the virtual machine 120 to another memory location in the memory 114. The migration module 134 may also migrate memory pages of the virtual machine 120 to the destination host machine 104. For example, the migration module 134 may read memory pages from the guest memory 122 and transmit the memory pages via the network 106 to the destination host machine 104. The destination hypervisor 118 may read the transmitted data and store the data in a guest memory on the destination host machine 104. The destination hypervisor 118 may then allocate the guest memory to a newly created virtual machine 136. Accordingly, a virtual machine 136 may be provided on the destination host machine 104 that is a replicate of the virtual machine 120.

The migration module 134 is structured to include a migration status 138 corresponding to the memory pages of the virtual machine 120. The migration status 138 may include a migration bitmap that includes one or more migrate status bits corresponding to the memory pages that indicate whether the memory pages are to be included in the migration. For example, a cleared migrate status bit (e.g., 0) may indicate that a memory page is to be excluded from the migration, while a set migrate status bit (e.g. 1) may indicate that the memory page is to be migrated. In other examples, the migration status may be maintained in a list, table, or other data structure. For example, the migration status 138 may include a list of memory pages that are to be migrated or a list of memory pages that are to be excluded from the migration. Accordingly, during the migration, the migration module 134 may iterate through the list of memory pages and migrate memory pages based on the migrate status bit corresponding to the memory pages.

Figure 2:
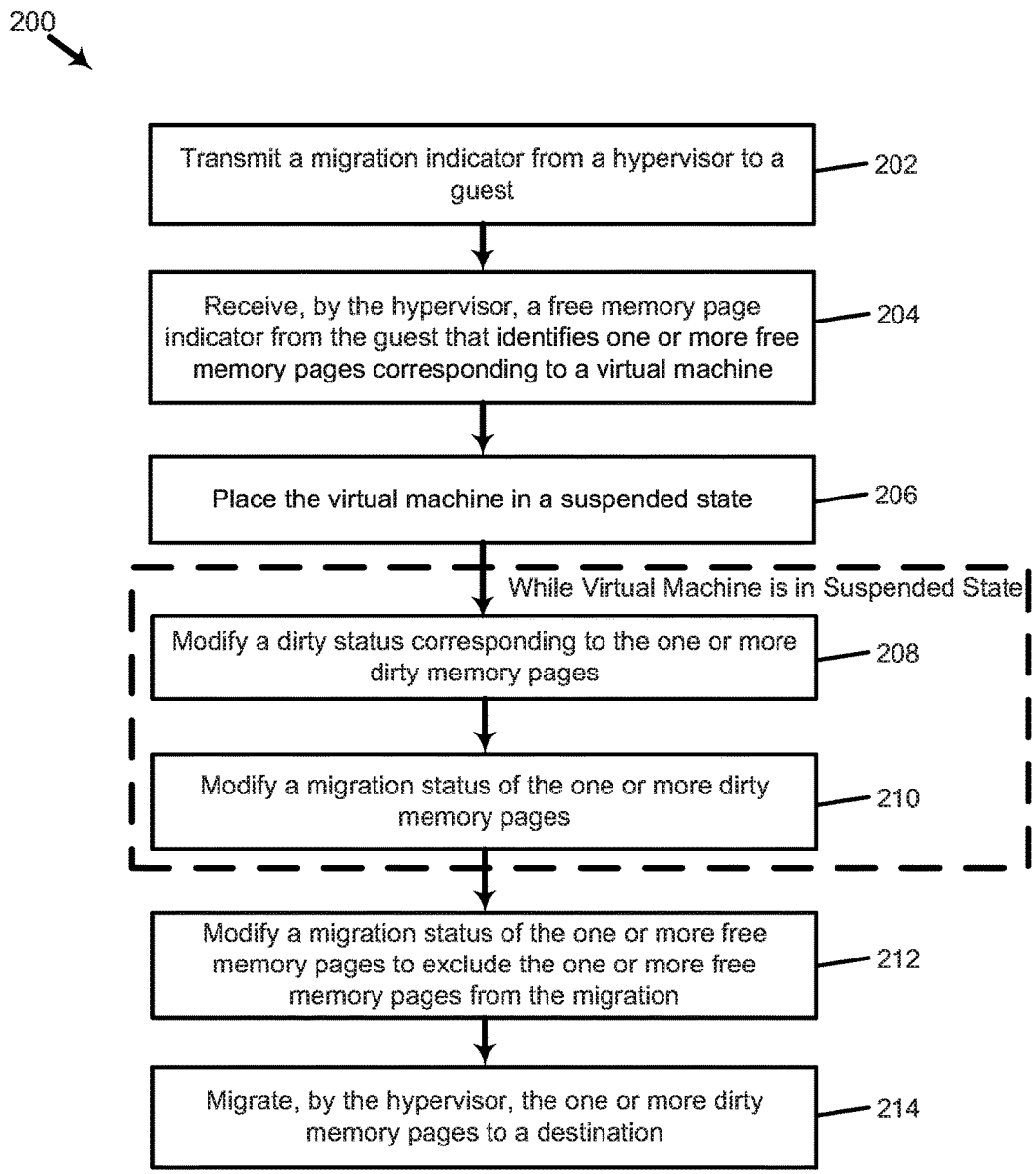
FIG. 2 is a flow diagram illustrating a method for migrating a virtual machine, in accordance with various examples of the present disclosure.

FIG. 2 is a flow diagram illustrating a method 200 for migrating a virtual machine, in accordance with various examples of the present disclosure. The method 200 may be performed by the one or more processors (e.g., processor 112 or 322) executing computer-readable instructions that are stored on a memory (e.g., memory 114 or 324).

At action 202, a hypervisor (e.g., hypervisor 116 or 302) transmits a migration indicator (e.g., migration indicator 308) to a guest (e.g., guest 128 or 304) corresponding to a migration of a virtual machine (e.g., virtual machine 120 or 306). The hypervisor transmits the migration indicator to the guest running on the virtual machine to notify the guest that a migration has been initiated. The transmitted migration indicator may be a signal sent from the hypervisor, an input from a user, or any other communication that indicates to the virtual machine that the hypervisor is migrating the virtual machine. For example, the migration indicator may be a request from the hypervisor for the guest to identify free memory pages of the virtual machine, so that the hypervisor may exclude these free memory pages from a migration. The guest receives this migration indicator from hypervisor.

In the present example, the hypervisor sends the migration indicator prior to beginning the migrating of memory pages of the virtual machine to a destination, such as another portion of memory or to a destination host machine. The migration may include reading data from memory pages of the virtual machine and transmitting the read data to the destination host machine over a network.

At action 204, after receiving the migration indicator, the guest identifies one or more free memory pages in the guest memory that are allocated to the virtual machine. When the guest identifies one or more free memory pages, the guest sends a free memory page indicator (e.g., free memory page indicator 310) and/or a plurality of free memory page indicators to the hypervisor. The hypervisor receives the free memory page indicator(s). The free memory page iridicator(s) identify one or more free memory pages corresponding to the virtual machine.

A free memory page indicator may include any communication from the guest to the hypervisor that identifies one or more free memory pages. For example, the communication may be sent via shared memory, interrupts, hypercalls, and/or other signaling mechanisms. The guest may send free memory page indicators to the hypervisor before and/or during the migration of memory pages from the guest memory. For example, the method may include asynchronously providing free memory page indicators from the guest to the hypervisor while the hypervisor is concurrently migrating memory pages of the virtual machine.

The guest may provide the free memory page indicator to identify the free memory pages in various ways. For example, the guest may traverse guest page tables or read bits from, a free bitmap to identify the free memory pages. In some examples, the guest sends the hypervisor a plurality of free page indicators while memory pages of the virtual machine are being read and transmitted over the network from the hypervisor to a destination host machine during a migration of the virtual machine. Accordingly, if one or more memory pages are dirty at a particular point in time, but later become free memory pages, the guest may send the hypervisor one or more free memory page indicators that identify these one or more memory pages as free memory pages.

At action 206, responsive to receiving one or more free memory page indicators, the hypervisor places the virtual machine in a suspended state. In the present example, the suspended state is a state in which the guest may not modify memory pages of the virtual machine. In some examples, the virtual machine is placed in the suspended state by stopping a virtual processor of the virtual machine. This may be performed by triggering a virtual machine exit (e.g., by sending an interrupt to the CPU executing the virtual machine). In some examples, the guest triggers the virtual machine exit via a hypercall or a communication to the hypervisor by memory mapped I/O or port I/O. The hypervisor may also place the virtual machine in a suspended state by transitioning a processor from a guest mode to a host kernel mode and/or a host userspace mode, such that the processor executes instructions of the hypervisor and/or host machine and does not execute instructions of virtual machine guests. For example, the processor may be transitioned from the guest mode to the host kernel mode, and then from the host kernel mode to the host userspace mode.

At action 208, while the virtual machine is in the suspended state, the hypervisor modifies a dirty status corresponding to one or more dirty memory pages. For example, the hypervisor may determine which memory pages are dirty by reading a dirty bitmap that identifies the dirty memory pages. The hypervisor may then modify a dirty bit (or other status indicator) in the dirty bitmap by performing an action such as clearing dirty bits corresponding to the determined dirty memory pages. By modifying the dirty status of the dirty memory pages, the hypervisor may detect further modifications to the dirty memory pages. For example, if the dirty memory pages are later modified, their dirty bits may again be set. Thus, by modifying the dirty status of the dirty memory pages, the hypervisor may resume detecting modifications regarding the dirty memory pages. In some examples, the modifying of the dirty status includes write-protecting the memory pages so that attempts to write to the memory pages may be detected by the hypervisor (e.g., using page faults, exceptions, and so forth as described in more detail below).

The hypervisor may determine which memory page are dirty memory pages in many ways. For example, memory pages may be write protected during initialization of the virtual machine to remove write access permissions of the guest with respect to the memory pages. Thus, an attempted write access of the memory pages by the guest may cause a page fault to occur, which may trigger a processor to generate an exception that provides the hypervisor with the identities of the one or more memory pages whose attempted modification triggered the page fault. Accordingly, the hypervisor may determine that the memory pages that are identified in the exception are dirty memory pages and update a dirty bitmap by setting bits corresponding to the determined dirty memory pages. The hypervisor may then allow the attempted modification to be performed so that the memory pages may be modified by the attempted write access. In some examples, the modification is performed by changing the permissions of the memory pages to allow the guest to perform the page writes or by the hypervisor performing the page writes on behalf of the guest In other examples, the hypervisor identifies which memory pages are dirty memory pages by reading a communication from the guest to the hypervisor, where the communication indicates which memory pages are dirty memory pages. For example, the communication may be sent from the guest to the hypervisor via shared memory, interrupts, hypercalls, and/or other signaling mechanisms. In more detail, in some examples the guest may send dirty memory page indicators to the hypervisor before and/or during the migration of memory pages from the guest memory of the virtual machine. For example, the method may include asynchronously providing dirty memory page indicators from the guest to the hypervisor while the migration is concurrently being performed by the hypervisor.

At action 210, the hypervisor modifies a migration status of the one or more dirty memory pages that have had their dirty status modified in action 208. The hypervisor modifies the migration status of these memory pages to indicate that these memory pages are to be included in the migration. The migration status of the identified one or more dirty memory pages may be modified in data structure, such as a bitmap data structure that includes a bit for each memory page. The bitmap may include bits for the memory pages that are set to indicate memory pages to include in the migration or cleared to indicate memory pages to exclude from the migration. Accordingly, the hypervisor may set a bit in the data structure corresponding to each identified dirty memory page, such that the hypervisor migrates these identified dirty memory pages of the virtual machine while skipping migration of any identified free memory pages. In other examples, the migration status may be modified by adding the determined one or more dirty memory pages to a list of pages to include in the migration. In yet other examples, the determined one or more dirty memory pages may be included in the migration by removing them from a list of pages that are excluded from the migration. As can be seen from the above examples, memory pages may be included or excluded from the migration using various different data structures.

After updating the migration status of the dirty memory pages, the virtual machine may be resumed from the suspended state to allow processing operations corresponding to the guests of the virtual machine. In some examples, the hypervisor may trigger a virtual machine re-entry by executing a VM Entry instruction. The hypervisor may also resume operations of the virtual machine from the suspended state by transitioning a processor from a host kernel and/or host userspace mode to a guest mode, such that instructions of the hypervisor and also the virtual machine guests may be executed.

At action 212, after the virtual machine is resumed from the suspended state, the hypervisor modifies the migration status of the one or more free memory pages identified by the free memory page indicator to exclude the identified one or more free memory pages from the migration. In some examples, as discussed above, memory pages may be included and excluded from the migration using various different data structures. For example, the migration status of the identified one or more free memory pages may be modified by clearing bits in a bitmap data structure, removing the free memory pages from a list of memory pages to include in the migration, or adding the free memory pages to a list of memory pages to exclude from the migration. Accordingly, the hypervisor may hypervisor migrate other memory pages of the virtual machine, such as the dirty memory pages, while not migrating the identified one or more free memory pages.

At action 214, the hypervisor migrates the memory pages of the virtual machine to the destination, which may be another location in memory or another host machine. In some examples, the hypervisor reads the migration status of memory pages from a data structure, such as a list or a bitmap, and migrates the memory pages that are indicated to be included in the migration, while not migrating memory pages that are indicated to be excluded from the migration. Data structures that may be used to include memory pages in a migration and exclude memory pages from a migration are discussed in more detail above.

The hypervisor may migrate the memory pages by reading data from the memory pages and writing the data to the destination. For example, to migrate the memory pages to another portion of memory, the hypervisor may copy the memory pages to the portion of memory. In another example, to migrate the memory pages to a destination host machine, the hypervisor may provide the data to a network module that transmits the data over the network to the destination host machine. The hypervisor may migrate memory pages at any time, such that the migration may occur concurrently and asynchronously with respect to the actions of the guest. Thus, the action 214 may occur after, before, or during any of the actions described above. For example, the hypervisor may start migrating memory pages immediately after sending the migration indicator to the guest. In other examples, the hypervisor may delay for a predetermined amount of time after sending the migration indicator, and then start migrating memory pages. In some examples, the predetermined amount of time is user-configured or set by the hypervisor based on tracking migration metrics. Accordingly, the migration of memory pages by the hypervisor may be performed asynchronously relative to the sending of free memory page indicators by the guest, in that the hypervisor may migrate memory pages without waiting to receive a free memory page indicator from the guest. The asynchronous nature of the migration improves the speed of the migration performed by the hypervisor by removing waiting periods and/or delays.

In the present example, actions 204, 206, 208, 210, and 212 may be repeated based on memory page updates that occur during the migration. For example, while the hypervisor performing action 214 to migrate memory pages, the hypervisor may receive the free memory page indicator from the guest at action 204, and commence actions 206, 208, 210, and 212 to modify the dirty status of determined dirty memory pages, update the migration status of the determined dirty memory pages, and update the migration status of the free memory pages based on the received free memory page indicator. Accordingly, memory page changes during the migration may asynchronously trigger actions 204, 206, 208, 210, and 212 so that memory pages may be asynchronously included and/or excluded from the migration.

Figure 3:
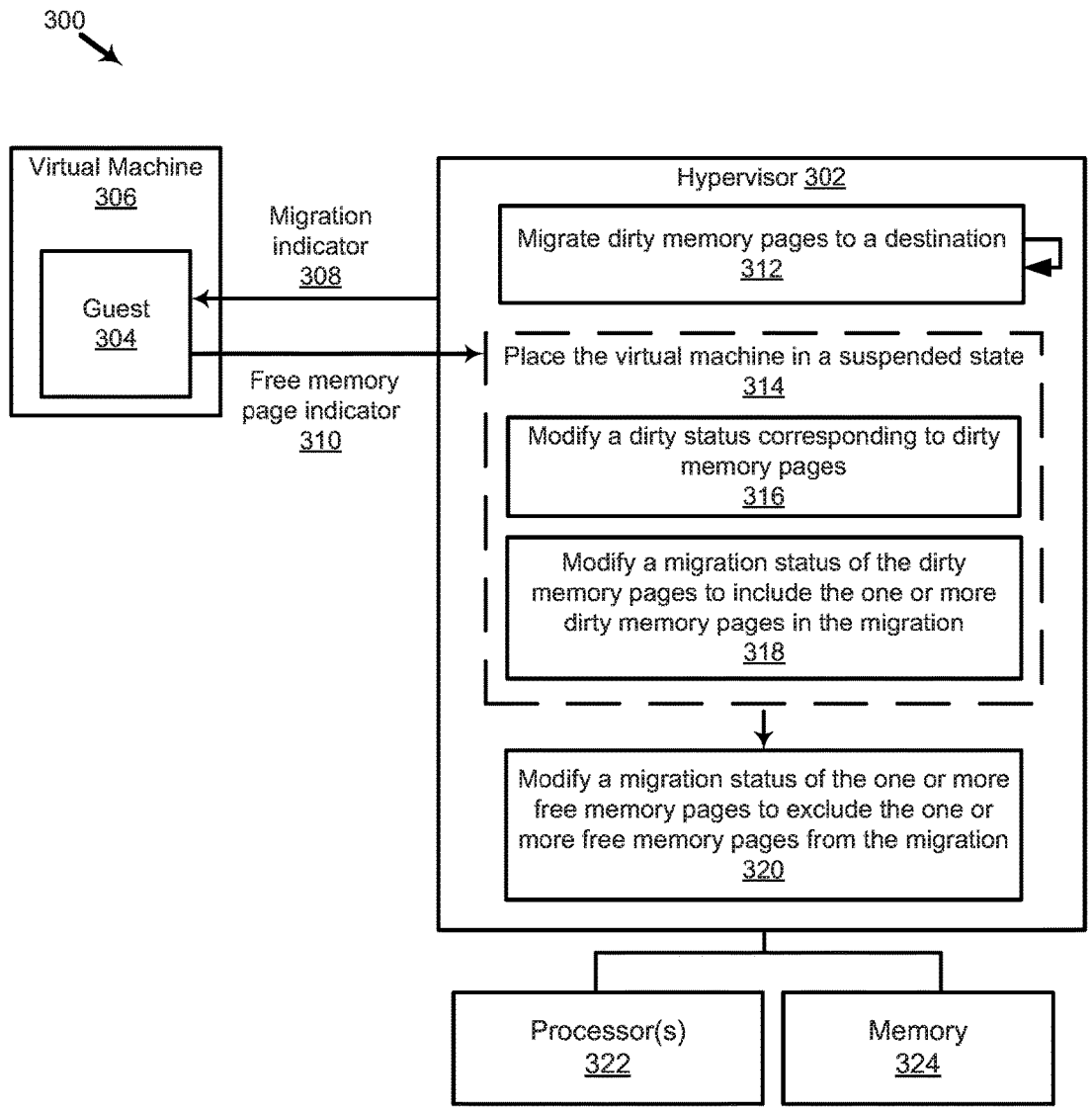
FIG. 3 is an organizational diagram illustrating a system for communicating migration indicators and memory page indicators between a hypervisor and a guest during a virtual machine migration, in accordance with various examples of the present disclosure.

FIG. 3 is an organizational diagram illustrating a system 300 for communicating migration indicators and memory page indicators between a hypervisor 302 and a guest 304 during a migration of a virtual machine 306, in accordance with various examples of the present disclosure. As illustrated in FIG. 3, the system 300 includes one or more hardware processors 322 coupled to a memory 324 that read instructions from the memory to cause the system to perform the migration operations.

In the present example, the system includes the hypervisor 302 that interacts with the guest 304 to migrate memory pages of the virtual machine 306 to a destination. The destination may be, for example, another host machine located over a network or another portion of the memory 322. The hypervisor 302 transmits a migration indicator 308 to the guest 304 to notify the guest that the migration has begun. The guest 304 then determines which memory pages on the virtual machine 306 are free memory pages and sends the hypervisor 302 a free memory page indicator 310 that identifies these free memory pages.

The hypervisor 302 performs the migration, at action 312, by transmitting memory pages that are included in the migration to the destination. Memory pages may be included in the migration in many ways, such as by including them in a migration list or modifying bits corresponding to the memory pages in a migration status bitmap.

During the migration, when, the hypervisor 302 receives the free memory page indicator 310, the hypervisor 302 places the virtual machine 306 in a suspended state at action 314. While the virtual machine 306 is in the suspended state, the hypervisor 302 performs actions 316 and 318 to modify a dirty status corresponding to determined dirty memory pages and to modify a migration status to include the one or more dirty memory pages in the migration.

After performing, actions 316 and 318, the hypervisor 302 resumes the operation of the virtual machine 306 from the suspended state. At action 320, the hypervisor 302 modifies a migration status of the free memory pages that were identified in the received free memory page indicator 310. The hypervisor 302 modifies the migration status of these free memory pages to exclude them from the migration.

Figure 4:
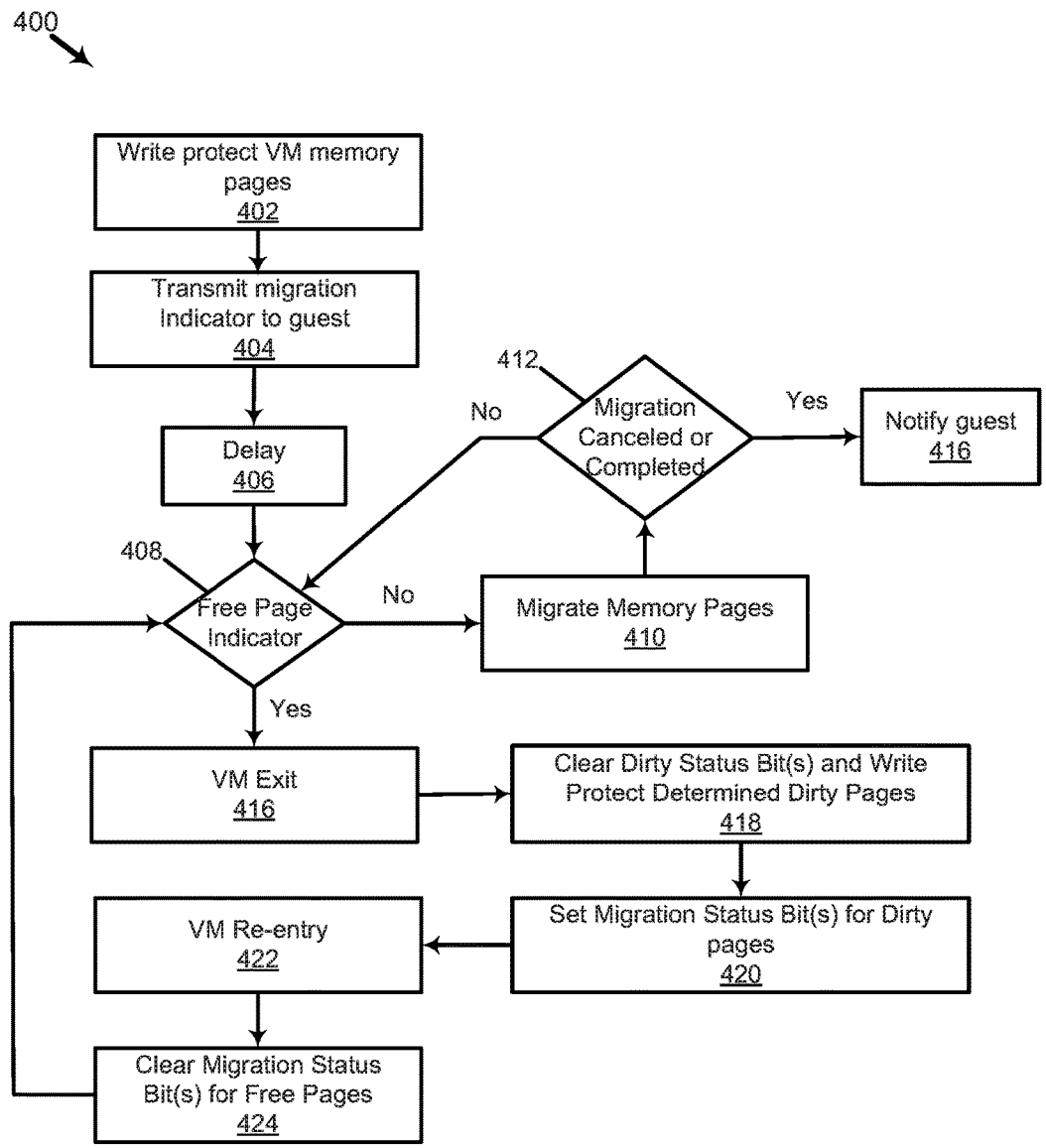
FIG. 4 is a flow diagram illustrating a method for migrating a virtual machine, in accordance with various examples of the present disclosure.

FIG. 4 is a flow diagram illustrating a method for migrating a virtual machine, in accordance with various examples of the present disclosure.

At action 402, the hypervisor write protects memory corresponding to one or more virtual machines, such as by marking the memory as read-only or removing write access permissions. When write accesses are attempted to be executed corresponding to the memory pages, page faults may be generated that allow the hypervisor to detect the attempted write accesses corresponding to these memory pages. The hypervisor may identify these memory pages as dirty memory pages. The hypervisor may then allow the write accesses to be processed so that these memory pages may be modified by the write accesses.

At action 404, the hypervisor transmits a migration indicator to a guest of a virtual machine. At action 406, the hypervisor delays for a preconfigured amount of time to provide the guest time to provide the hypervisor with one or more free memory page indicators.

The hypervisor determines at action 408 whether any free memory page indicators have been received from the guest. If free memory page indicators have not been received, the hypervisor migrates memory pages of the virtual machine at action 410. If the migration is determined to be canceled or completed at action 412, the hypervisor stops migrating memory pages and notifies the guest at action 416 that the migration is complete. For example, the migration may be completed when all memory pages that are indicated to be included in the migration have been migrated. In another example, the migration of the virtual machine may be canceled based on a user input or occurrence of a fault. Accordingly, at action 416, the hypervisor notifies the guest that the migration is complete. If the migration is not completed or canceled, the migration of memory pages at action 410 may continue until a free memory page indicator is received (e.g., at action 408) or until the migration is determined to be canceled or completed at action 412.

At action 416, if the hypervisor receives a free memory page indicator, the hypervisor triggers a virtual machine exit so that processing of instructions of the virtual machine's guests is temporarily suspended. In some examples, the virtual machine exit is performed by sending an interrupt to the CPU executing the virtual machine. While operation of the virtual machine is stopped, at action 418 the hypervisor clears a dirty status corresponding to the dirty memory pages to resume detecting dirty page indicators corresponding to the dirty memory pages. In the present example, a dirty status bit for each of the dirty memory pages is cleared in a dirty bitmap and the dirty memory pages are write protected to remove write access permissions of the guest.

Next, at action 420 the hypervisor modifies the migration status bits of the dirty memory pages by setting the migration status bits of the dirty memory pages. Accordingly, the dirty memory pages are added to a pool of memory pages scheduled for migration.

At action 422, after clearing the migration status bits, the hypervisor performs a virtual machine re-entry to resume operation of the virtual machine. In some examples, the virtual machine entry is performed by executing a VM Entry instruction.

At action 424, after resuming operation of the virtual machine, the hypervisor modifies the migration status bits of the free memory pages identified in the free memory page indicator by clearing their migration status bits. Accordingly, the free memory pages are removed from the pool of memory pages that are scheduled for migration.

After modifying the migration status bits at action 424, the hypervisor continues monitoring for free page indicators at action 408. While monitoring for free page indicators, the hypervisor continues migrating memory pages at action 410 until either a free memory page indicator is received at action 408 or the migration is canceled or completed at action 412.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
transmitting, from a hypervisor, a migration indicator to a guest;
delaying migration of one or more memory pages corresponding to a virtual machine for a predetermined amount of time after transmitting the migration indicator;
receiving, by the hypervisor and while the migration is delayed for the predetermined amount of time, a free memory page indicator from the guest, wherein the free memory page indicator identifies the one or one or more free memory pages corresponding to the virtual machine;
placing the virtual machine in a suspended state by performing a VM exit, wherein while the virtual machine is in the suspended state the hypervisor modifies a dirty status, applies write protection, and modifies a migration status corresponding to one or more dirty memory pages to include the one or more dirty memory pages in a migration;
after resuming operation of the virtual machine from the suspended state by performing a VM re-entry, modifying a migration status corresponding to the one or more free memory pages to exclude the one or more free memory pages from the migration; and
migrating, by the hypervisor, the one or more dirty memory pages based on the migration status corresponding to the one or more dirty memory pages.

2. The method of claim 1, wherein modifying the migration status corresponding to the one or more dirty memory pages comprises setting bits in a migration bitmap that identifies memory pages to include in the migration, and
wherein modifying the migration status corresponding to the one or more free memory pages comprises clearing bits in the migration bitmap.

3. The method of claim 1, wherein modifying the dirty status corresponding to the one or more dirty memory pages comprises clearing bits in a dirty bitmap and removing write access permissions corresponding to the one or more dirty memory pages.

4. The method of claim 1, further comprising:
prior to running the guest on the virtual machine, write-protecting one or more memory pages of the virtual machine; and
responsive to detecting attempted write accesses to the one or more memory pages, modifying a dirty status corresponding to the one or more memory pages to indicate that the one or more memory pages are dirty memory pages.

5. The method of claim 1, further comprising:
notifying the guest after completing or canceling the migration.

6. The method of claim 1, wherein the hypervisor continues migrating the one or more dirty pages until an additional free memory page indicator is received, the migration is cancelled, or the migration is completed.

7. A non-transitory machine-readable medium having stored thereon machine-readable instructions executable to cause a machine to perform operations comprising:
transmitting, from a hypervisor, a migration indicator to a guest;

delaying migration of one or more memory pages corresponding to a virtual machine for a predetermined amount of time after transmitting the migration indicator;

receiving, by the hypervisor and while the migration is delayed for the predetermined amount of time, a free memory page indicator from the guest, wherein the free memory page indicator identifies the one or one or more free memory pages corresponding to the virtual machine;

placing the virtual machine in a suspended state by performing a VM exit, wherein while the virtual machine is in the suspended state the hypervisor modifies a dirty status, applies write protection, and modifies a migration status to include one or more dirty memory pages;

after resuming operation of the virtual machine from the suspended state by performing a VM re-entry, modifying a migration status corresponding to the one or more free memory pages to exclude the one or more free memory pages from the migration; and migrating, by the hypervisor, the one or more dirty memory pages based on the migration status corresponding to the one or more dirty memory pages.

8. The non-transitory machine-readable medium of claim 7, wherein modifying the migration status corresponding to the one or more dirty memory pages comprises setting bits in a migration bitmap that identifies memory pages to include in the migration, and
wherein modifying the migration status corresponding to the one or more free memory pages comprises clearing bits in the migration bitmap.

9. The non-transitory machine-readable medium of claim 7, wherein modifying the dirty status corresponding to the one or more dirty memory pages comprises clearing bits in a dirty bitmap and removing write access permissions corresponding to the one or more dirty memory pages.

10. The non-transitory machine-readable medium of claim 7, the operations further comprising:
notifying the guest after completing or canceling the migration.

11. The non-transitory machine-readable medium of claim 7, wherein the hypervisor continues migrating the one or more dirty pages until an additional free memory page indicator is received, the migration is cancelled, or the migration is completed.

12. A system comprising:
one or more hardware processors coupled to a memory, the one or more hardware processors to read instructions from the memory and cause the system to perform operations comprising:
transmitting, from a hypervisor, a migration indicator to a guest;

delaying migration of one or more memory pages corresponding to a virtual machine for a predetermined amount of time after transmitting the migration indicator;

receiving, by the hypervisor and while the migration is delayed for the predetermined amount of time, a free memory page indicator from the guest, wherein the free memory page indicator identifies the one or one or more free memory pages corresponding to the virtual machine;

placing the virtual machine in a suspended state by performing a VM exit, wherein while the virtual machine is in the suspended state the hypervisor modifies a dirty status applies write protection, and modifies a migration status corresponding to one or more dirty memory pages to include the one or more dirty memory pages in a migration;

after resuming operation of the virtual machine from the suspended state by performing a VM re-entry, modifying a migration status corresponding to the one or more free memory pages to exclude the one or more free memory pages from the migration; and migrating, by the hypervisor, the one or more dirty memory pages based on the migration status corresponding to the one or more dirty memory pages.

13. The system of claim 12, wherein modifying the migration status corresponding to the one or more dirty memory pages comprises setting bits in a migration bitmap that identifies memory pages to include in the migration, and
wherein modifying the migration status corresponding to the one or more free memory pages comprises clearing bits in the migration bitmap.

14. The system of claim 12, wherein modifying the dirty status corresponding to the one or more dirty memory pages comprises clearing bits in a dirty bitmap and removing write access permissions corresponding to the one or more dirty memory pages.

15. The system of claim 12, the operations further comprising:
notifying the guest after completing or canceling the migration.

16. The system of claim 12, wherein the hypervisor continues migrating the one or more dirty pages until an additional free memory page indicator is received, the migration is cancelled, or the migration is completed.

* * * * *